United States Patent [19]
Steinke et al.

[11] Patent Number: 5,645,327
[45] Date of Patent: Jul. 8, 1997

[54] ANTILOCK CONTROL SYSTEM

[75] Inventors: Leo Steinke, Waiblingen; Armin Czinczel, Korntal-Münchingen; Thomas Isella, Markgröningen, all of Germany

[73] Assignee: Robert Bosch GmbH, Stuttgart, Germany

[21] Appl. No.: 392,876

[22] PCT Filed: Jul. 27, 1994

[86] PCT No.: PCT/DE94/00870
 § 371 Date: Mar. 3, 1995
 § 102(e) Date: Mar. 3, 1995

[87] PCT Pub. No.: WO95/03955
 PCT Pub. Date: Feb. 9, 1995

[30] Foreign Application Priority Data

Jul. 31, 1993 [DE] Germany .................. 43 25 780.1

[51] Int. Cl.⁶ .................................................... B60T 8/32
[52] U.S. Cl. ........................................... 303/157; 303/149
[58] Field of Search ................................ 303/149, 150,
  303/154, 155, 156, 157, 184, 72; 364/426.02

[56] References Cited

U.S. PATENT DOCUMENTS

| | | | |
|---|---|---|---|
| 4,027,926 | 6/1977 | Arai et al. | 303/109 |
| 4,485,445 | 11/1984 | Braschel | 364/426 |
| 4,693,522 | 9/1987 | Wupper et al. | 303/105 |
| 4,933,858 | 6/1990 | Matsuda | 303/156 X |
| 5,109,339 | 4/1992 | Watanabe et al. | 364/426.02 |
| 5,273,350 | 12/1993 | Yagi et al. | 303/154 |

*Primary Examiner*—Josie Ballato
*Attorney, Agent, or Firm*—Felfe & Lynch

[57] ABSTRACT

The wheel speeds are measured by wheel speed sensors and are fed to an evaluation circuit. By way of the evaluation circuit, brake pressure control signals at least for increasing pressure and for decreasing pressure for a specific duration are then produced for the closed-loop/open-loop control of the wheel movement behavior. Moreover, brake pressure control signals are also usually output by the evaluation circuit in order to keep the brake pressure constant. These brake pressure control signals are fed to brake pressure control units for varying the brake pressure. The core of the invention consists in the fact that the duration at least of the first decrease in brake pressure at the front wheels is selected to be dependent on the speed of the vehicle at the start of braking.

10 Claims, 3 Drawing Sheets

ANTILOCK CONTROL SYSTEM

BACKGROUND OF THE INVENTION

The invention relates to an antilock control system (ABS) in which measured wheel speeds are fed to an evaluation circuit which produces brake pressure control signals for increasing and decreasing brake pressure in stages having specific durations. In known systems, it is possible that, given full application of the brakes for only a short time, the braking distance may in certain conditions be longer than in a vehicle without ABS.

SUMMARY OF THE INVENTION

The invention is based on an antilock control system for motor vehicles, in which the wheel speeds are measured by means of wheel speed sensors and are fed to an evaluation circuit. By means of the evaluation circuit, brake pressure control signals at least for increasing pressure and for decreasing pressure for a specific duration are then produced for the closed-loop/open-loop control of the wheel movement behavior. Moreover, brake pressure control signals are also usually output by the evaluation circuit in order to keep the brake pressure constant. These brake pressure control signals are fed to brake pressure control units for varying the brake pressure. The core of the invention consists in the fact that the duration at least of the first decrease in brake pressure is selected to be dependent on the vehicle speed at the start of braking.

The advantage of the invention consists in the fact that the braking distance is shortened for full braking starting from a relatively low speed. The invention therefore prevents lengthening of the braking distance in vehicles with ABS, in comparison with vehicles without ABS, given full braking starting from a relatively low speed.

In particular, there is provision according to the invention for the decrease in brake pressure to be influenced at the front wheels, but such influencing of the decrease in brake pressure is also possible at the rear wheels.

In an advantageous embodiment of the invention there is provision for the duration of at least the first decrease in brake pressure to be selected to be additionally dependent on the determined grip of the underlying surface.

During the first control cycle of the ABS, the utilization of the braking power is significantly less efficient than in the subsequent control cycles. This is because in the case of full application of the brakes, due to occurrence of slippages, the controller must cope with a highly non-steady-state process at the start of control and because the feedback necessary for optimization is only available in the following control cycles. If the entire process of full application of the brakes is relatively short, the first control cycle (or cycles) goes into strong braking, as a result of which the resulting braking distance may be longer than in the case of braking without ABS. This applies typically if full braking takes place at a relatively low starting speed on an underlying surface with good grip.

The invention tolerates the fact that the steerability may be reduced in the first control cycle (or cycles); the driving stability is however retained completely. The following estimation shows that, under the given circumstances, shortening the braking distance is more important for avoiding an accident than optimum steerability.

At an initial speed of 40 km/h and with a deceleration of 10 m/sec$^2$, a time with reduced steerability of approximately 1 sec results; in this time, little can be achieved by means of a steering maneuver.

In particular, there is provision according to the invention for the duration of at least the first decrease in brake pressure which takes place within the first control cycle to be selected to be longer at higher vehicle speeds at the start of braking than at lower vehicle speeds at the start of braking.

In a simple embodiment of the invention, the duration has a fixed value if the speed of the vehicle is lower at the start of braking than a selectable first threshold value. If the speed of the vehicle is higher at the start of braking than the selectable first threshold value, the duration can be selected independently of the speed of the vehicle at the start of braking, that is to say the duration of the decrease in brake pressure takes place according to the known ABS control algorithm, that is to say without the reduction according to the invention.

If the duration is selected, as already mentioned, to be additionally dependent on the determined grip of the underlying surface, the determination of the grip of the underlying surface advantageously takes place by means of an evaluation of the speed of the vehicle. Here, the grip of the underlying surface is derived from the change of the speed of the vehicle over time.

For the taking into account, according to the invention, of the condition of the underlying surface, there may be provision in a simple embodiment of the invention for the duration of the decrease in brake pressure to have a fixed value if the speed of the vehicle is lower at the start of braking than a selectable first threshold value and, additionally, the determined grip of the underlying surface is higher than a selectable second threshold value. Here, the duration is also independent of the speed of the vehicle at the start of braking if the speed of the vehicle at the start of braking is higher than the selectable first threshold value or if the determined grip of the underlying surface is lower than the selectable second threshold value, that is to say that the duration of the decrease in brake pressure takes place according to the known ABS control algorithm, that is to say without the reduction according to the invention.

The coefficient of adhesion can be derived as a measure of grip from the increase in the speed ($V_{ref}$) of the vehicle.

Advantageously, the aforesaid first threshold value for the speed of the vehicle lies in the region from 0 to 60 km/h at the start of braking and the second threshold value for the coefficient of adhesion which represents the grip of the underlying surface lies in the region of 0.5.

DETAILED DESCRIPTION OF THE PREFERRED EMBODIMENTS

Figure 1:
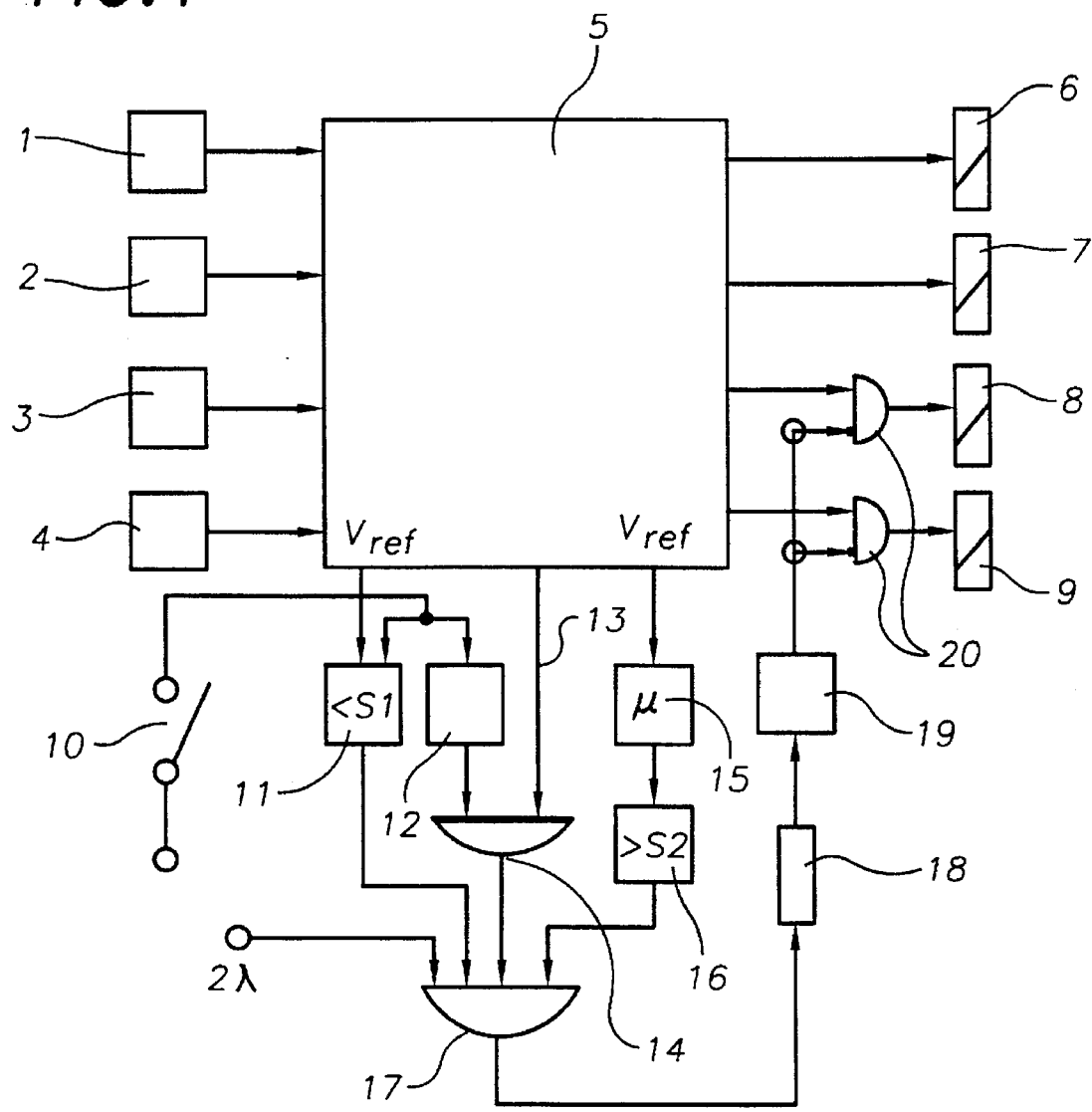
FIG. 1 is a diagram of a first embodiment.

Referring to FIG. 1, the wheel speed sensors 1 to 4 supply signals to an evaluation circuit 5 which forms brake pressure control signals from them in accordance with the wheel movement behavior and thus actuates brake pressure control units 6, 7, 8 and 9. For the sake of simplicity, only the brake pressure control units for the front wheels are illustrated here in the form of inlet valves 6 and 7 and outlet valves 8 and 9. However, it is to be noted carefully that the invention also relates to the decrease in brake pressure of the rear wheels. A reference speed $V_{ref}$ which is approximated to the speed of the vehicle is formed in the evaluation circuit 5 from the wheel speed signals.

The switch 10 is activated at the start of ABS control or when an ABS control is triggered. In the simplest case, the switch can also be constructed as a brake light switch. With the activation of the switch 10, a comparator 11 is also activated, the said comparator 11 determining whether at that moment the reference speed or the speed of the vehicle is lower than a first threshold value S1 (e.g. 40 km/h) and then outputting a signal. At the same time, the signal of the brake light switch 10 sets a monostable element 12 into its second position in which it outputs a signal for a time of e.g. 0.3 sec. The response of the first outlet valve 8 or 9 produces a signal on a line 13. If this occurs before the 0.3 sec have expired, an AND gate 14 becomes conductive.

Optionally, in the case of the condition of the underlying surface being additionally taken into account, the reference speed $V_{Ref}$ is fed to a further block 15, after which the increase in this reference speed is determined in this block, the said increase being a measure of the grip μ of the underlying surface. The grip μ of the underlying surface is then fed to a comparator 16 which compares the grip of the underlying surface with a second threshold value S2. If, as a result of the comparator 16, a vehicle deceleration is obtained which indicates a high μ [e.g. μ>(S2=0.6)] (or a high adhesion k, for example k>0.6) a signal is also transmitted from this branch to an AND gate 17.

The AND gate 17 becomes conductive when all the inputs conduct a signal. In this way it is indicated that conditions are present in which shortening duration of the drop in pressure, that is to say a reduction in the decrease in pressure, to a selectable duration seems to be appropriate. This signal is fed to a timing element 18 which, after a delay time of e.g. 12 ms, outputs a signal which sets a monostable element 19 with a time constant of e.g. 6 ms. Thus, 12 ms after the triggering of the outlet valve, and for a time of 6 ms, a signal is supplied to AND gates 20 which prevent the outlet valves 8 and 9 from being triggered during this time.

Thus, the decrease in pressure, the beginning of which on the line 13 starts the process described above, is interrupted after 12 ms, which brings about a reduced decrease in pressure. A signal which only occurs in the first control cycle, that is to say only during the first decrease in pressure, at a terminal 21 causes the decrease in pressure which is shortened to the duration of 12 ms only to occur in the first control cycle, that is to say only during the first decrease in pressure.

While the first exemplary embodiment shows a simple design of the invention, an extended second embodiment will be described with reference to FIG. 2.

Figure 2:
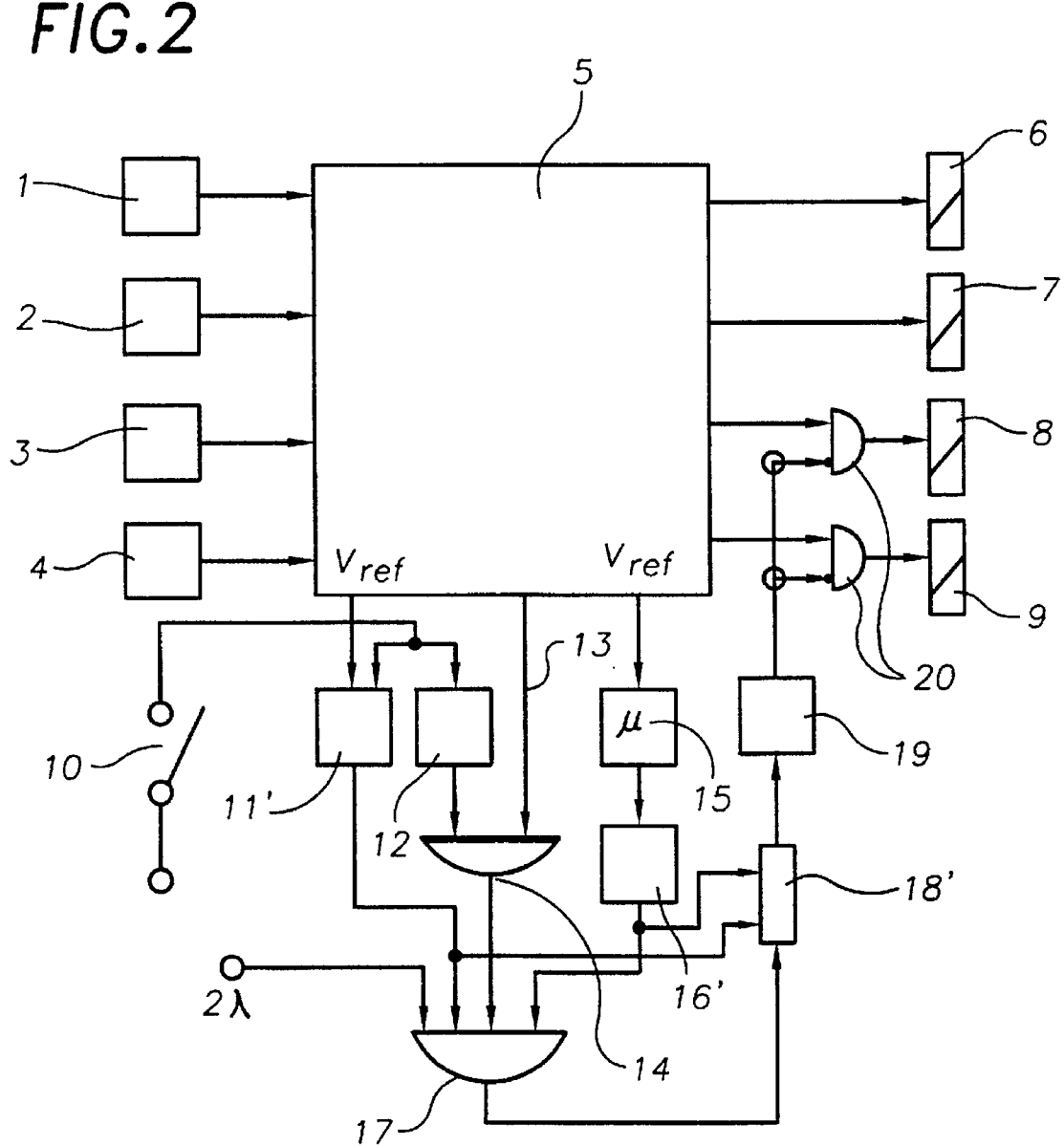
FIG. 2 is a diagram of a second embodiment.

In FIG. 2, essentially the same blocks with the same functions can be seen as in FIG. 1. Therefore, a repetition of the description will be dispensed with. Differences from the first exemplary embodiment are the changed blocks 11', 16' (optionally) and 18'.

In the changed block 11' and optionally in the changed block 16', the value of the speed $V_{ref}$ of the vehicle or the value of the condition μ of the underlying surface at the start of the braking process are determined. On the output side of these blocks, there is then in each case a signal which represents the size of these signals and is fed to the AND gate 17, in a manner already described, and to the timing element 18'. On the output side of the timing element 18', a signal is now present at the monostable element 19 after a delay time has expired. The essential feature of this exemplary embodiment is that by means of the timing element 18' the delay time is selected to be dependent on the value of the speed $V_{ref}$ of the vehicle or of the value of the condition μ of the underlying surface at the start of the braking process.

This ensures that the duration of the first decrease in brake pressure can be selected to be longer for example at higher speeds $V_{ref}$ of the vehicle at the start of braking than at lower speeds $V_{ref}$ of the vehicle at the start of braking. Thus a finer application is possible with respect to the conflict of objectives between a short braking distance and steerability in that a higher priority can be accorded to the steerability of the vehicle as the speed of the vehicle increases.

Figure 3:
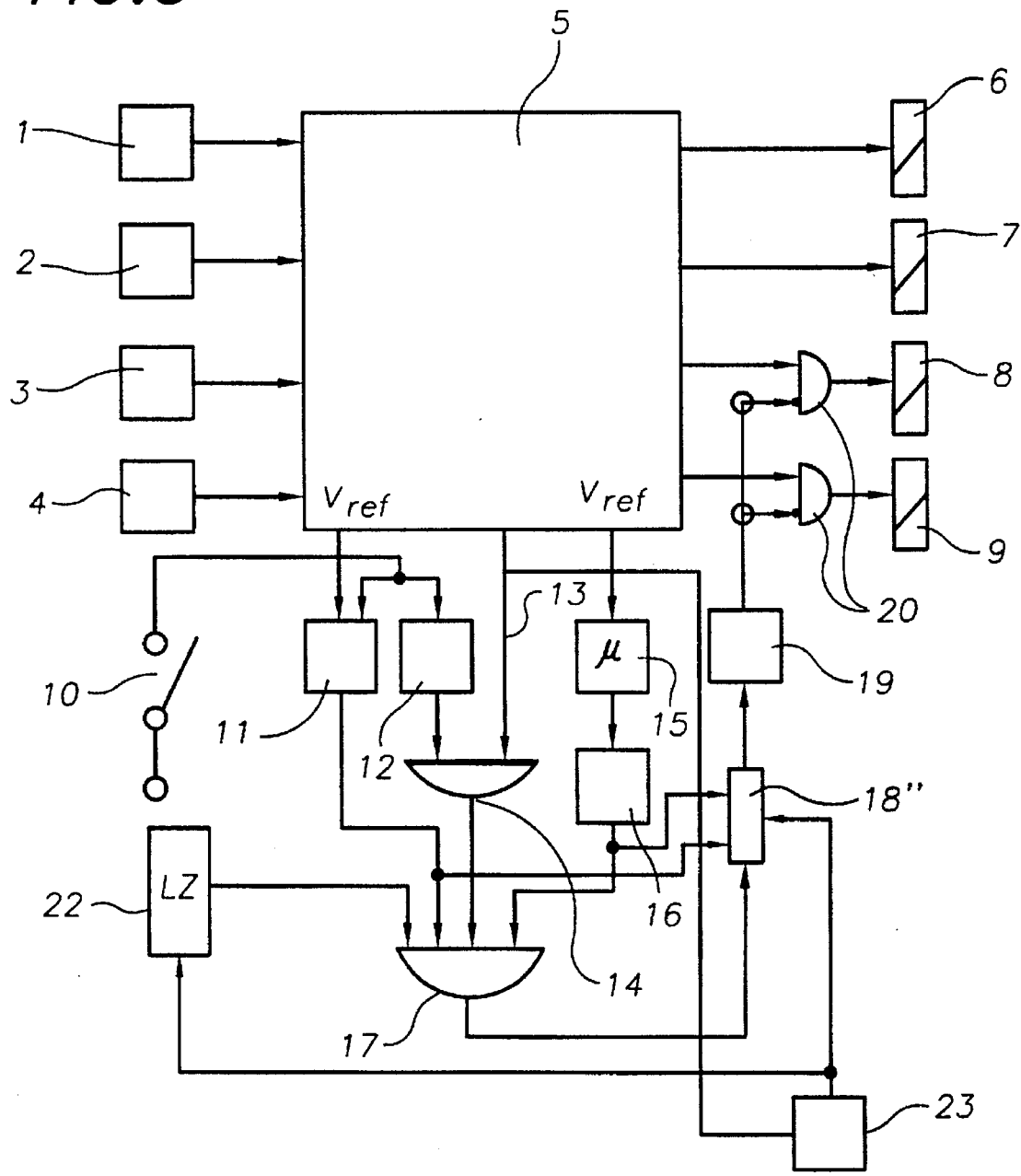
FIG. 3 is a diagram of a third embodiment.

In FIG. 3, essentially the same blocks with the same functions as in FIG. 2 can be seen. A repetition of the description will therefore also be dispensed with here. Differences from the first exemplary embodiment are the new blocks 22 and 23 and the changed block 18".

As in the first exemplary embodiment, the triggering of the first outlet valve 8 or 9 produces a signal on a line 13. This signal is now additionally fed to a counter 23. The counter 23 counts the triggering pulses of the first outlet valves 8 and 9 and transmits corresponding signals to the comparator 22 and optionally to the timing element 18'. In the comparator 22, the counting signal is compared with a threshold Z. Until the threshold Z is reached, a signal is present at the AND gate 17 on the output side of the comparator 22. This permits the following:

While in the first and second exemplary embodiments described only the duration of the first decrease in brake pressure is limited over time according to the invention (terminal 21), in the third exemplary embodiment the influencing of the duration of the decrease in brake pressure according to the invention can also take place for the further periods of decrease in brake pressure. Thus, for example by setting the threshold value Z=3, it is possible to influence the duration for the first two periods of decrease in brake pressure.

In addition to the extension of the invention, described with respect to the first and second exemplary embodiments, beyond the first decrease in brake pressure, there is also optional provision for the output signals of the counter 23 to be fed to the timing element 18", by means of which signals are transmitted to the monostable element 19 as a function of the counter state (output signal of the counter 23) after different delay times. This permits the duration of the periods of decrease in brake pressure to become longer as their number increases.

We claim:

1. Method for controlling brake pressure at the wheels of a motor vehicle, said method comprising measuring speeds of the wheels, determining when braking begins, determining a vehicle speed $V_{Ref}$ when braking begins, determining slippage at each wheel based at least on said wheel speeds, producing at least one brake pressure reduction signal for each wheel where slippage occurs, said at least one signal having a duration and including at least a first reduction signal, the duration of said first reduction signal being dependent on said vehicle speed $V_{Ref}$ when braking begins, and decreasing brake pressure at each wheel where slippage occurs in stages having durations corresponding to the durations of said at least one pressure reduction signal at said each wheel where slippage occurs.

2. Method as in claim 1 wherein the duration of said first reduction signal is longer for higher $V_{Ref}$ when braking begins than at lower $V_{Ref}$ when braking begins.

3. Method as in claim 1 wherein the vehicle speed $V_{Ref}$ when braking begins is compared to a first threshold value S1 and the duration of said first reduction signal has a fixed value if $V_{Ref}$ when braking begins is less than S1.

4. Method as in claim 1 wherein the vehicle speed $V_{Ref}$ when braking begins is compared to a first threshold value S1 and the duration of said first reduction signal is independent of $V_{Ref}$ when braking begins if $V_{Ref}$ when braking begins exceeds S1.

5. Method as in claim 1 further comprising determining the grip μ of the underlying road surface and making the duration of said first reduction signal additionally dependent on μ.

6. Method as in claim 5 further comprising determining the reference speed $V_{Ref}$ after braking begins, said grip μ being determined from said reference speed $V_{Ref}$ after braking begins.

7. Method as in claim 6 wherein a change in vehicle speed over time is determined from said reference speed $V_{Ref}$ after braking begins, said grip μ being determined from said change in vehicle speed over time.

8. Method as in claim 5 wherein said vehicle speed $V_{Ref}$ when braking begins is compared to a first threshold S1 and said grip μ is compared to a second threshold S2, and the duration of said first reduction signal is fixed if $V_{Ref}$ when braking beings is smaller than S1 and μ is higher than S2.

9. Method as in claim 8 wherein the duration of said first reduction signal is independent of $V_{Ref}$ if $V_{Ref}$ when braking begins is higher than S1 and μ is lower than S2.

10. Method as in claim 9 wherein S1 is 0 to 60 km/h and S2 is 0.5.

* * * * *

UNITED STATES PATENT AND TRADEMARK OFFICE
CERTIFICATE OF CORRECTION

PATENT NO. : 5,645,327
DATED : July 8, 1997
INVENTOR(S) : Steinke et al.

It is certified that error appears in the above-identified patent and that said Letters Patent is hereby corrected as shown below:

On the title page, item [57], Abstract, line 1, after "by" insert -- means of --.

In column 3, line 5, delete "said".

In column 3, line 18, delete "said".

Signed and Sealed this

Fifteenth Day of August, 2000

Attest:

Q. TODD DICKINSON

Attesting Officer

Director of Patents and Trademarks